(12) United States Patent
Yong

(10) Patent No.: US 6,963,904 B2
(45) Date of Patent: Nov. 8, 2005

(54) METHOD FOR CORRELATING AN ELECTRONIC MAIL MESSAGE WITH RELATED MESSAGES

(75) Inventor: Edward G. Yong, Sioux City, IA (US)

(73) Assignee: Gateway Inc., Irvine, CA (US)

( * ) Notice: Subject to any disclaimer, the term of this patent is extended or adjusted under 35 U.S.C. 154(b) by 746 days.

(21) Appl. No.: 09/752,580

(22) Filed: Dec. 27, 2000

(65) Prior Publication Data

US 2002/0091772 A1 Jul. 11, 2002

(51) Int. Cl.[7] .............................................. G06F 15/16
(52) U.S. Cl. ........................ 709/207; 709/202; 709/203
(58) Field of Search ................................ 709/203, 204, 709/206, 207, 217

(56) References Cited

U.S. PATENT DOCUMENTS

| | | | |
|---|---|---|---|
| 5,905,863 A | | 5/1999 | Knowles et al. |
| 6,088,720 A | * | 7/2000 | Berkowitz et al. .......... 709/206 |
| 6,094,681 A | | 7/2000 | Shaffer et al. |
| 6,108,688 A | | 8/2000 | Nielsen |
| 6,393,566 B1 | * | 5/2002 | Levine ........................ 713/178 |
| 6,449,635 B1 | * | 9/2002 | Tilden et al. ................ 709/206 |
| 6,647,383 B1 | * | 11/2003 | August et al. .................. 707/3 |
| 6,694,335 B1 | * | 2/2004 | Hopmann et al. .......... 707/201 |
| 6,721,784 B1 | * | 4/2004 | Leonard et al. ............. 709/206 |

FOREIGN PATENT DOCUMENTS

EP        0825752 A2 *  2/1998  ............ H04M/3/50

* cited by examiner

*Primary Examiner*—Paul H. Kang
(74) *Attorney, Agent, or Firm*—Jeffrey A. Proehl; Ross F. Hunt, Jr.; Stiles & Harbison

(57) ABSTRACT

A method for correlating an electronic mail message with related (e.g., reply or forwarded) electronic mail messages is disclosed. When a user initiates a reply to an electronic mail message on an electronic mail system, the system checks for reply or other (e.g., forwarded) messages which are related to the original electronic mail message and are received by the user at a later time.

18 Claims, 2 Drawing Sheets

METHOD FOR CORRELATING AN ELECTRONIC MAIL MESSAGE WITH RELATED MESSAGES

FIELD OF THE INVENTION

The present invention relates to electronic mail messaging, and more specifically to, correlating an electronic mail message with related electronic mail messages (e.g., replies and forwards).

BACKGROUND OF THE INVENTION

Electronic mail is a popular way for people to send messages to one another. Common and accepted protocols such as Post Office Protocol (POP) and Simple Mail Transfer Protocol (SMTP) are used to handle electronic mail messages across a communications network. A typical electronic mail system includes one or more clients connected to a first server, and one or more other servers connected to that first server. Using protocols such as POP and SMTP, electronic mail messages are transferred between servers as well as between a client and its corresponding server.

An electronic mail message typically includes one or more header fields and a message body attached to those header fields. The header fields may include a "from" field identifying the sender, a "to" field identifying the recipient, a date sent field, and fields for other data. The message body may include ASCII text, text in hypertext markup language (HTML) form, data corresponding to a graphical icon representing an attachment, or other message data. One or more attachments may also form part of the electronic mail message, and may be attached to the end of the message after the message body. A mail server for handling electronic mail messages typically assigns each message received by that server a unique identifier. Electronic mail messages typically are transmitted from a mail server to a client program upon request by an authorized user, or automatically when received by the server.

If the user wishes to send a response to a particular electronic mail message, he or she typically can select a reply option offered by the mail client. The generation of the reply message is typically handled on the client side. The mail client copies the contents of the "from" field from the original message into the "to" field of the reply message, and may also copy the subject line and the body of the message. The mail client may also add a phrase or text element such as "RE:" or "REPLY:" to the beginning of the subject line of the reply message, and/or highlight the original text with carets or other symbols. If the original message was sent to a number of people, as is common in a business environment, the user may wish to reply to all of them. Typically, the user may do so by selecting a "reply to all" feature on the client side, in which case the contents of both the "from" field and the "to" field of the original message are copied into the "to" field of the reply message.

The popularity of electronic mail has resulted in a high volume of electronic mail messages. A given person routinely may receive thirty or more electronic mail messages in a single day. If that person is at a computer throughout the day, this volume of mail can be handled easily. However, if that person takes a vacation, or is out of the office, for several days or weeks, electronic mail messages can build up and form a large backlog. As the user works through these messages, he or she may reply to one of them, only to find that a later, as-yet-unnoticed message from the original sender or from another recipient of the original message made it unnecessary to reply. For example, a person in an accounting department at a company may send out an electronic mail message to other people in the accounting department, requesting information about a transaction. An electronic mail user who has been on vacation may reply to that message with that information, only to find that another member of the department has already provided that information, and sent it out to all of the recipients of the original message. Thus, when a user has a large backlog of electronic mail messages, he or she may waste time replying to messages when those replies are unnecessary.

SUMMARY OF THE INVENTION

Embodiments of the present invention provide a method for correlating an electronic mail message with related (e.g., reply or forwarded) electronic mail messages. When a user initiates a reply to an electronic mail message on an electronic mail system, the system checks for reply or other (e.g., forwarded) messages which are related to the original electronic mail message and are received by the user at a later time.

DETAILED DESCRIPTION OF PREFERRED EMBODIMENTS

In preferred embodiments of the present invention, a method is provided for correlating an electronic mail message with related (e.g., reply or forwarded) electronic mail messages. When a user initiates a reply to an electronic mail message on an electronic mail system, the system checks for reply or other (e.g., forwarded) messages which are related to the original electronic mail message and are received by the user at a later time.

Figure 1:
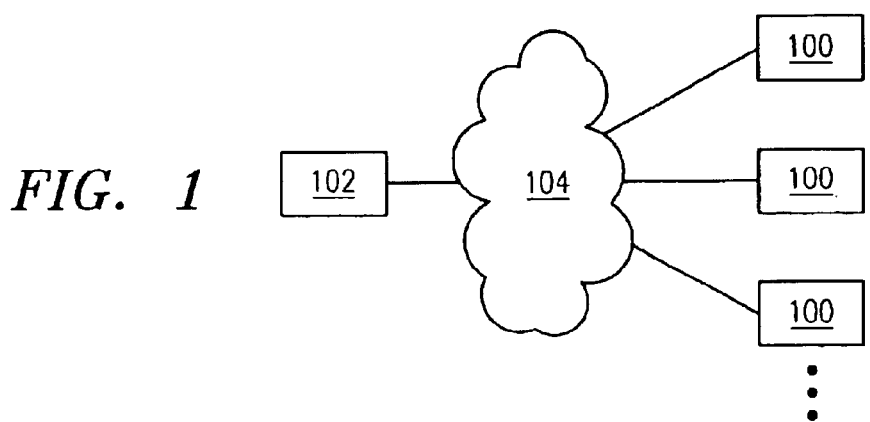
FIG. 1 is a schematic view of an electronic mail server connected to a number of clients via a communications network.

Referring to FIG. 1, one or more electronic mail clients 100 are connected to a mail server 102 via a communications network 104 such as a local or wide area network, the Internet, or the like. The electronic mail clients 100 are software programs for reading, writing and otherwise handling electronic mail messages. Each client 100 may be a commercial program such as Microsoft Outlook or Eudora, a free or open-source program, a feature of a larger or more comprehensive software program or package, or any other software or instructions adapted to handle electronic mail messages. The individual electronic mail clients 100 need not be the same software program. The electronic mail clients 100 each run on an information handling system, such as a general purpose computer, Internet appliance, personal digital assistant (PDA) or other information handling system capable of connecting to the electronic mail server 102. Different clients 100 may run on different kinds of information handling systems. The type of information handling system on which each client 100 runs is not critical to the invention. While three clients 100 are shown in FIG. 1, less than three clients 100 or more than three clients 100 may be connected to the server 102 at the same time. In a preferred embodiment, the connections between each individual client 100 and the server 102 are temporary, and are terminated after communication between each client 100 and the server 102 is completed. However, these connections may be persistent or permanent if desired. The server 102 may be a single information handling system, or may be a plurality of information handling systems connected together. The relationship between the server 102 and each client 100 is preferably a standard client/server network relationship. Although FIG. 1 shows a single mail server 102, a plurality of mail servers 102 preferably are connected to one another over a communications network 104 such as the Internet via standard physical connections and protocols, such as POP and/or SMTP. In this way, people at widely disparate locations using different mail servers may send and receive electronic mail messages from one another.

Figure 2:
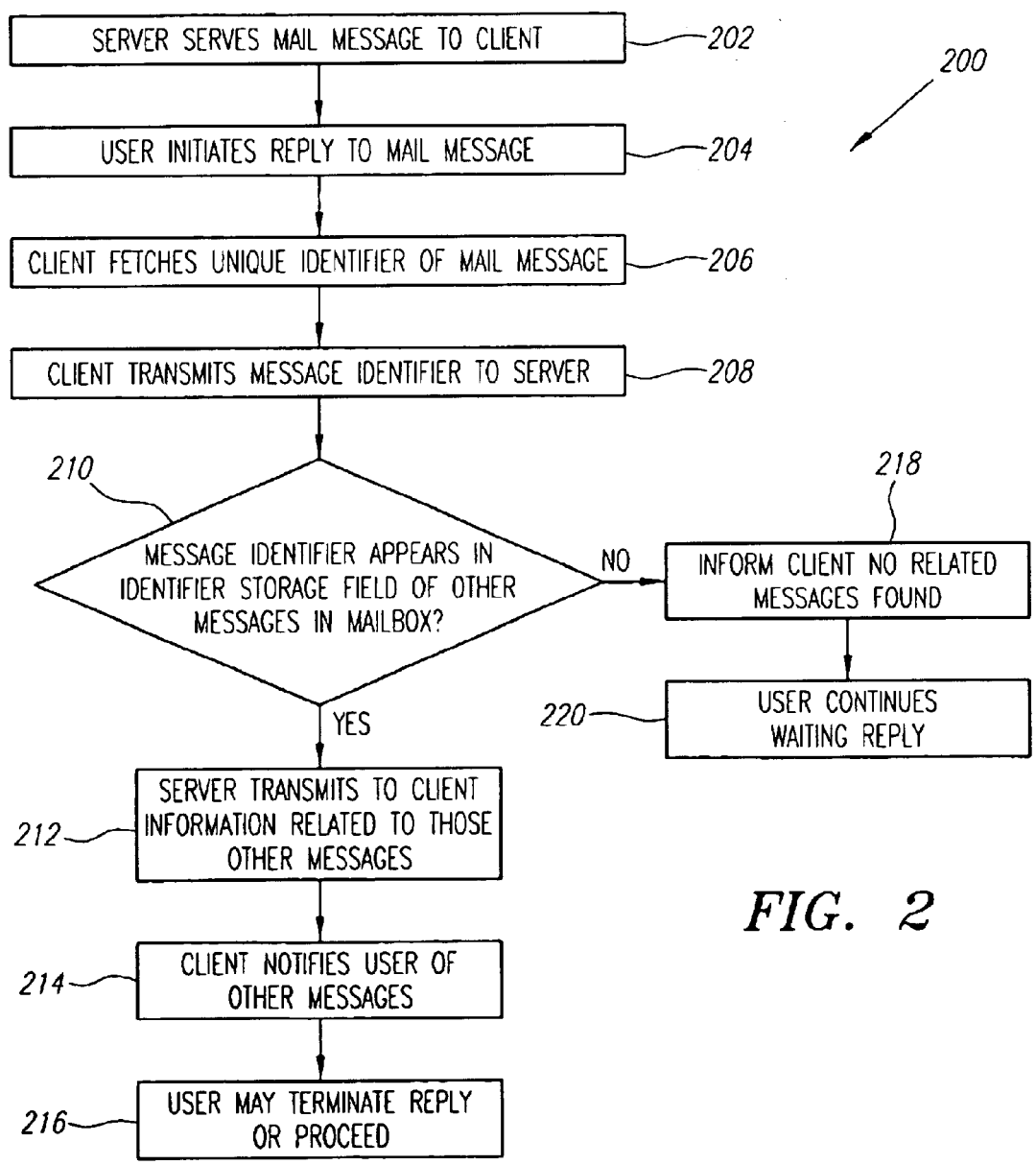
FIG. 2 is a flow chart illustrating a method for determining whether other messages in a user's mailbox are later-composed replies to a particular message selected by the user.
Figure 3:
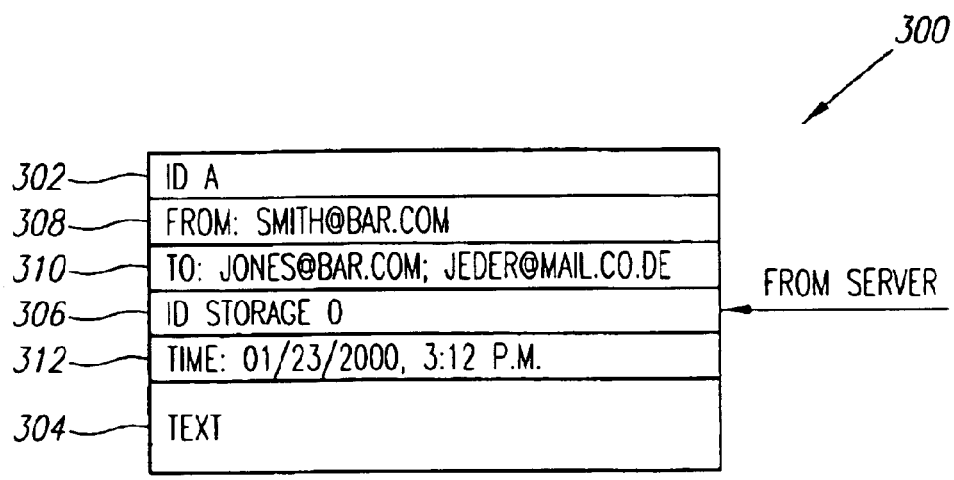
FIG. 3 is a pictorial representation of relevant components of an electronic mail message received by an electronic mail client from a server.
Figure 4:
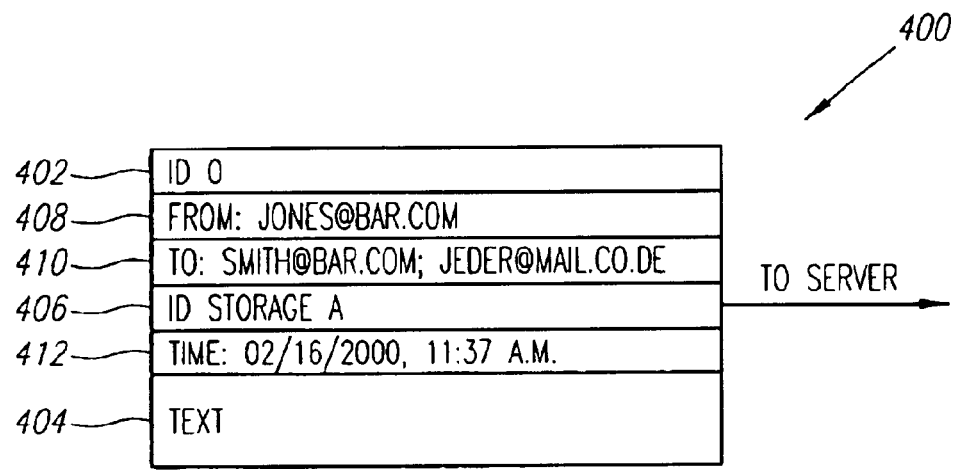
FIG. 4 is a pictorial representation of relevant components of an electronic mail message composed as a reply to the message of FIG. 3, as prepared for transmission to the server.
Figure 5:
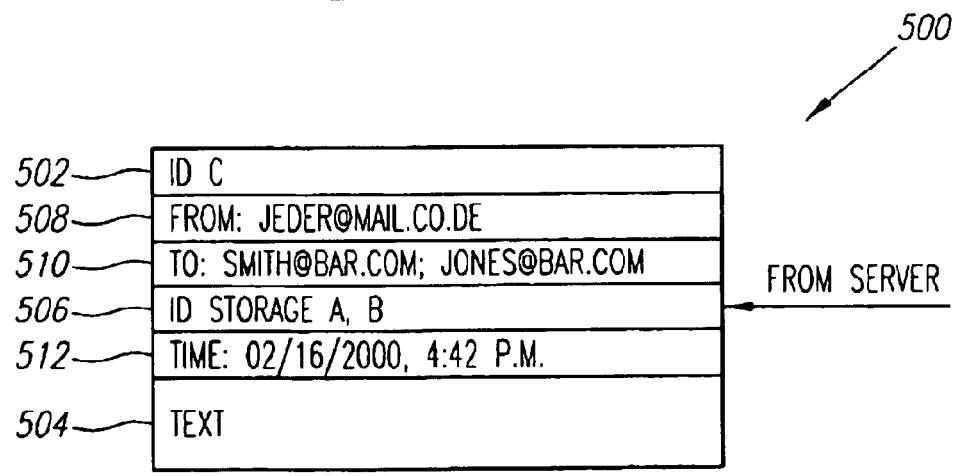
FIG. 5 is a pictorial representation of relevant components of an electronic mail message received, in reply to the message of FIG. 4, by an electronic mail client from the server.

Referring as well to FIG. 2, a method 200 for replying to an electronic mail message is shown. As background for the method 200, several pictorial depictions of exemplary electronic mail messages are shown in FIGS. 3–5. FIG. 3 is a pictorial representation of an electronic mail message 300 served by a mail server 102 to a client 100. The electronic mail message 300 is preferably served from a mailbox on the mail server 102, where the mailbox is uniquely associated with the user. The mailbox stores electronic mail messages sent to the user, then serves those messages or copies thereof to the client 100 automatically or upon request. The use of a mailbox on a server 102, where that mailbox is associated with a particular user, is standard. The electronic mail message 300 includes a unique identifier field 302, a text field 304, an identifier storage field 306, a "from" field 308, a "to" field 310, and a time field 312. The electronic mail message 300 may include additional fields. The text field 304 includes the text that forms the body of the message 300 transmitted to the user. The client 100 preferably allows for the selection of a particular message 300 and the subsequent display of that message 300 to a user, as is standard. The unique identifier field 302 preferably includes a single unique identifier assigned by the mail server 102 that serves the message 300 to the client 100. The assignment of such a unique identifier is part of, for example, the POP protocol. The unique identifier is preferably an alphanumeric string. As an example, the unique identifier "A" is stored in the unique identifier field 302 of the electronic mail message 300. While the unique identifier "A" is used here for simplicity, actual unique identifiers are typically substantially longer, to ensure that unique identifiers can be generated quickly and easily. The electronic mail message 300 includes in the "from" field 308 the electronic mail address of the person or entity transmitting the electronic mail message 300. As an example, if the sender is Smith, having an electronic mail address of "smith@bar.com," that address appears in the "from" field 308. Similarly, the "to" field 310 contains the electronic mail address or addresses of the people or entities to which the electronic mail message 300 is sent. As an example, if Jones and Jeder are the recipients of the message, the "to" field 310 includes their electronic mail addresses of "jones@bar.com" and "jeder@mail.co.de." The time field 312 preferably includes the time and date when the message 300 was sent to the recipient.

Referring as well to FIG. 4, the client 100 generates a reply message 400. The reply message "from" field 408 contains the electronic mail address of the user, which is preferably inserted automatically by the client 100. The client 100 inserts the contents of the "from" field 308 of the original electronic mail message 300 into the "to" field 410 of the reply message 400. Optionally, the client 100 also may fill the "to" field 410 of the reply message 400 with the contents of the "to" field 310 of the original electronic mail message 300, so that the reply message 300 can be used to reply to every user who has seen the original electronic mail message 300. The client 100 may insert the text field 304 of the original message 300 into the text field 404 of the reply message 400, if desired. The reply message unique identifier field 402 is preferably blank, or contains a null character, because the unique identifier is preferably assigned by a mail server 102, not the client 100, as part of a protocol such as POP. The client 100 writes to the reply message identifier storage field 406 the contents of the unique identifier field 302 of the original message 300, in order to designate that the reply message 400 is a reply to the specific original message 300. The reply message 400 is then transmitted to the mail server 102 for forwarding to the electronic mail addressees identified in the "to" field 410. The time the reply message 400 is sent is written to the time field 412.

The server 102 then handles the reply message 400 according to standard protocols. For example, if the reply message 400 is addressed to another user associated with the server 102, then the reply message 400 is routed to that user's mailbox on the server 102, and the server 102 assigns that message a unique identifier. As another example, if the reply message 400 is addressed to a user associated with a second server, the reply message 400 is routed to the second server, which then transmits the reply message 400 to the user's mailbox and assigns that message a unique identifier. As illustrated by this example, standard mail protocols require the receiving server to assign each electronic mail message a unique identifier. As an example, when the reply message 400 is received at the second server 102 having a mailbox for Jeder, that second server 102 assigns the reply message 400 a unique identifier "B".

A recipient of the reply message 400 may send a reply to the reply message 400, which is generated by a mail client 100 as described above with regard to the creation of the reply message 400. Such a third message 500 is routed to the mailbox of the creator of the reply message 400 and served to the client 100 associated with that user. The third message 500 is assigned a unique identifier "C" by the server 102 when it arrives in the mailbox of the user, and "C" is written to the unique identifier field 502 of the third message 500. The third message identifier storage field 506 includes identifiers "A" and "B". The identifier "B" was added to the third message identifier storage field 506 when Jeder initiated the third message 500 in response to the reply message 400 having the unique identifier "B" stored in its unique identifier field 402. The third message 500 also includes a text field 504, a "from" field 508, a "to" field 510, and a time field 512 indicating the time the third message 500 was sent.

Turning to the method 200, in step 202, a mail server 102 serves an electronic mail message to a client 100. Serving an electronic mail message from a server to a client 100 is standard, and may be accomplished via POP, SMTP or other mail protocols. The server 102 may serve the electronic mail message to the client 100 automatically, or at the request of the client 100.

Next, in step 204, the user initiates a reply to the electronic mail message received in step 202. The initiation of a message may be any input by which the user indicates that he or she wishes to send a reply message. For example, the user may click on an icon or button generated by the client 100 in the context of a graphical user interface, where that icon or button is associated with the initiation of a reply to a selected electronic mail message. Preferably, the reply message is not immediately created; rather, the steps of the method 200 described below are performed first. In another embodiment, initiation of a reply message in this step results in the creation of a reply message by the client 100, as described above in regard to the creation of the reply message 400.

Next, in step 206, the client 100 fetches the contents of the unique identifier field of the electronic mail message that the user selected for reply in step 204. For example, if the user selected the electronic mail message 300 to create a reply, the client 100 fetches the contents of the unique identifier field 302, which in this example is "A". The client 100 may fetch the contents of the unique identifier field by copying its contents to a register or memory storage unit, or by performing a different standard data retrieval operation.

Next, in step 208, the client 100 transmits to the server 102 the unique identifier fetched in step 206, as well as the username or other descriptor associated with the user. When the server 102 receives this data, the method 200 proceeds to step 210. In step 210, the server 102 searches all electronic mail messages present in the user's mailbox on the server 102, to determine whether the identifier transmitted to the server 102 in step 208 is present in the identifier storage field of one or more of the electronic mail messages stored in the user's mailbox. The particular mailbox to be searched is identified with the username or other descriptor transmitted to the server 102 in step 208. The unique identifier fetched in step 206 and transmitted to the server 102 in step 208 preferably is stored temporarily in the server 102, in a structure such as a register or other memory storage apparatus. The comparison of the unique identifier to the contents of each electronic mail message stored in the user's mailbox may be performed with standard methods.

If one or more messages in the user's mailbox have an identifier storage field that contains the unique identifier fetched in step 206, then the server 102 may take one or more actions. First, the server 102 may simply count those electronic mail messages, storing the count in a register or other memory storage apparatus. Second, the server 102 may instead, or in addition, store the unique identifier of each such electronic mail message that is present in the user's mailbox. Third, the server 102 may instead, or in addition, store the time information contained in the time field of each such electronic mail message that is present in the user's mailbox. By storing the time information of each electronic mail message in the user's mailbox that contains the unique identifier fetched in step 206 in its identifier storage field, the server 102 may sort those messages by time sent and determine which of those messages is the latest to be transmitted. Other data may be collected or utilized by the server 102 to analyze the electronic mail messages in the user's mailbox containing the identifier fetched in step 206 in the identifier storage field.

Next, if any messages are present in the user's mailbox having the identifier fetched in step 206 in the identifier storage field, the process proceeds to step 212. In step 212, the server 102 transmits to the client 100 information relating to the electronic mail messages in the user's mailbox that have in their identifier storage fields the identifier fetched in step 206. The particular information transmitted in step 212 is related to the information derived in step 210. For example, in one embodiment, the server 102 transmits to the client 100 the number of messages in the user's mailbox that include in their identifier storage fields the unique identifier transmitted to the server in step 206. As another example, the server 102 may transmit to the client 100 the unique identifier of the most recent message in the user's mailbox having in its identifier storage field the unique identifier fetched in step 206—that is, the unique identifier of the latest message in reply to the electronic mail message selected in step 204.

Next, in step 214, the client 100 notifies the user that related messages are present in the user's mailbox, based on the information transmitted to the client 100 from the server 102 in step 212. The client 100 may provide such notification in a number of ways. As one example, the client 100 may display a dialog box or other alert indicating the number of messages already present in the user's mailbox that are replies to the message selected by the user in step 204. As another example, the client 100 may highlight to the user electronic mail messages stored in the client 100 that already have been sent in reply to the message selected by the user in step 204. As yet another example, the client 100 may open the latest (i.e., most recent) message sent in reply to the message selected by the user in step 204. The client 100 may otherwise present information to the user relating to the presence and/or number of electronic mail messages in the user's mailbox that have been sent in reply to the message selected by the user in step 204. Finally, in step 216, the user may consider the information displayed in step 214 and decide whether to proceed with the reply to the message selected in step 204. The user may proceed with that reply if desired, or terminate or otherwise delete that reply.

Returning to step 210, if no messages in the user's mailbox contain the identifier fetched in step 206 in the identifier storage field, the process proceeds from step 210 to step 218. In step 218, the server 102 transmits a message to the client 100 that no electronic mail messages present in the user's mailbox contain the identifier fetched in step 206 in the identifier storage field. Finally, in step 220, the user may continue with a reply to the message selected in step 204. Preferably, the user is not notified of the transmission received from the server 102 in step 218, in order to simplify the process of composing a reply message. However, if desired, the user may be notified in step 220 that no replies have been received to the message selected in step 204.

In an embodiment described above, electronic mail messages to the user are retained in the user's mailbox at the server 102, and copies of those messages are served to the client 100. In another embodiment, the electronic mail messages are served to the client 100, and are not stored in the server 102. This embodiment may be referred to as a client-side embodiment. As a result, in this embodiment several steps in the method 200 are performed differently than described above, although the principles are the same. Step 208 is omitted; the unique identifier fetched in step 206 from the electronic mail message is not transmitted to the server 102. Rather, in step 210, the client 100 compares that unique identifier fetched in step 206 to the identifier storage field of each electronic mail message stored in the client 100, because the messages are stored on the client side rather than the server side. Steps 212 and 218 are omitted, as there is no need to transmit data to the client 100 from a server 102; the client 100 itself performs the comparison of the unique identifier to the identifier storage field. In other respects, this embodiment of the method 200 is performed substantially as described above.

The method 200 may also be utilized in conjunction with a web-based electronic mail system, such as Microsoft's Hotmail. In such an embodiment, the client 100 is typically a web browser such as Netscape's Communicator or Microsoft's Internet Explorer. This embodiment may be referred to as a server-side embodiment. As a result, in this embodiment several steps in the method 200 are performed differently than described above, although the principles are the same. Step 206 is omitted, as the mail message identifier resides in the server 102. In step 208, a message is transmitted to the server 102 from the client 100, indicating that the user wishes to respond to a particular electronic mail message. The identification of the user and of the particular message is inherent in the selection of a message for a reply in a web-based electronic mail system. Further, steps 212 and 214 preferably are combined, because the server 102 preferably notifies the client 100 of related messages by serving the client 100 a web page, applet, or other data for display to the user.

While the embodiments above have been described in terms of reply messages, it will be apparent that the same method may be applied to messages selected by a user for forwarding. It will also be apparent that forwarded messages may be handled in the same manner, wherein the unique identifier of a mail message may be written to the identifier storage field of a message created as a forward of the original message. By tracking forwarded messages in the same manner as reply messages, the usefulness of the method 200 is enhanced.

A preferred method for correlating an electronic mail message with related (e.g., reply or forwarded) messages, and many of its attendant advantages, have thus been disclosed. It will be apparent, however, that various changes may be made in the content and arrangement of the steps of the process without departing from the spirit and scope of the invention, the methods and forms hereinbefore described being merely preferred or exemplary embodiments thereof. Therefore, the invention is not to be restricted or limited except in accordance with the following claims and their legal equivalents.

What is claimed is:

1. A method for responding to an electronic mail message selected by a user, where the user accesses a mailbox adapted to store one or more electronic mail messages, each electronic mail message having a unique identified and an identifier storage field, the method comprising the steps of:

retrieving the unique identifier of the selected electronic mail message;

searching the mailbox for at least one related electronic mail message having the unique identifier of the selected electronic mail message in the identifier storage field of said related electronic mail message;

if at least one related electronic mail message having the unique identifier is located in the mailbox during said searching the mailbox step, determining which of the selected electronic mail message and the at least one related electronic mail message has at least sent time; and providing information relating to results of said searching the mailbox step, including differentiating the electronic mail message having the lastest sent time from any other electronic mail message having the unique identifier.

2. The method of claim 1, further comprising the step of displaying to the user said information relating to said results of said searching the mailbox step.

3. The method of claim 2, wherein said displaying step is executed in response to a request from the user to respond to the selected electronic mail message.

4. The method of claim 1, wherein said information relating to said results of said searching the mailbox step comprises a count of said related electronic mail messages found in said searching the mailbox step.

5. The method of claim 1, wherein said information relating to said results of said searching the mailbox step comprises the unique identifier of each said related electronic mail message found in said searching the mailbox step.

6. The method of claim 1, wherein each electronic mail message further comprises a time field for storing a sent time, and wherein said searching the mailbox step further comprises the step of searching the time field of each said related electronic mail message for a sent time later than the sent time of the selected electronic mail message.

7. The method of claim 6, wherein said information relating to said results of said searching the mailbox step comprises data relating to results of said searching the time field step.

8. A nethod for generating a response to a first electronic mail message received by a user, the first electronic mail message received from a mailbox associated with the user and adapted to store one or more electromic mail messages, each electronic mail message having a unique identifier, an identifier storage field, and a time field for storing a sent time, comprising the steps of:

receiving a request from the user to respond to the first electronic mail message;

retrieving the unique identifier of the first electronic mail message;

receiving information about related electronic mail messages stored in the mailbox and determined from a search of the mailbox to be sent in response to the first electronic mail message based on the unique identifier of the first electronic mail message, said receiving information step including the step of determining which said related electronic mail message has a latest sent time in the field;

displaying said information to the user; and highlighting to the user said related electronic mail message having the latest sent time in the time field.

9. The method of claim 8, wherein said related electronic mail message are determined to be sent in response to the first electronic mail message if the unique identifier of the first electronic mail messag is stored in the identifier storage field of said related electronic mail message.

10. The method of claim 8, wherein said information displayed to the user comprises a count of said related electronic mail messages.

11. The method of claim 8, wherein said information displayed to the user comprises a listing of said related electronic mail messages, wherein said listing includes at least one of a sender, a recipient, a subject, a sent time, and a message body.

12. The method of claim 8, furthr comprising the steps of:

generating a reply electronic mail message to said first electronic mail message, said reply electronic mail message comprising a reply identifier storage field; and storing the unique identifier of the first electronic mail message in said reply identifier storage field of said reply electronic mail message.

13. The method of claim 1, wherein said step of differentiating the electronic mail message having the latest sent time includes visually differentiating the electronic mail message.

14. The method of claim 13, wherein the step of visually differentiating comprises highlighting the electronic mail message having the latest sent time.

15. The method of claim 13, wherein the step of visually differentiating comprises the electronic mail message having the latest sent time.

16. A computer readable medium having embodied thereon a computer program, the computer program being executable by a machine to perform a method for responding to an electronic mail message selected by a user, where the user accesses a mailbox adapted to store one or more electronic mail messages, each electronic mail message having a unique identifie, and identifier storage field, and a time field for storing a sent time, the method comprising the steps of:

retrieving the unique identifier of the selected electronic mail message;

searching the mailbox for at least one related electronic mail message having the unique identifier of the selected electronic mail mesage in the identifier storage field of said related electronic mail message, said searching the mailbox step including the steps of:

searching the time field of each said related electronic mail message for a sent time later than the sent time of the selected electronic mail message; and determining which said related electronic mail message has a latest sent time in the time field;

providing information relating to results of said searching the mailbox step, including differentiating the electronic mail message determined to have the latest sent time from any other electronic mail message having the unique identifier.

17. The computer readable medium of claima 16, further comprising the step of displaying to the user said information relating to said results of said searching the mailbox step.

18. A method for generating a response to a first electronic mail message received by a user, the first electronic mail message received from a mailbox associated with the user and adapted to store one or more electronic mail messages, each electronic mail message having a unique identifier a time field for storing a sent time, an identifier storage field, and comprising the steps of:

receiving a request from he user to respond to the first electronic mail message;

retrieving the unique identifier of the first electronic mail message;

receiving information about related electronic mail messages stored in the mailbox and determined from a search of the mailbox to be sent in response to the first electronic mail message based on the unique identifier of the first electronic mail message, said receiving information step including the step of determining which said related electronic mail message has a latest sent time in time field;

displaying said information to the user; and opening for the user said related electronic mail message having the latest sent time in the time field.

* * * * *